United States Patent [19]
Okuya et al.

[11] Patent Number: 6,056,370
[45] Date of Patent: May 2, 2000

[54] BRAKE PRESSURE CONTROLLER

[75] Inventors: Akinori Okuya, Chiryu; Hiroshi Toda, Kariya, both of Japan

[73] Assignee: Aisin Seiki Kabushiki Kaisha, Kariya, Japan

[21] Appl. No.: 09/061,898

[22] Filed: Apr. 17, 1998

[30] Foreign Application Priority Data

Apr. 17, 1997 [JP] Japan ................................ 9-100480

[51] Int. Cl.$^7$ ............................ B60T 8/40; B60T 13/18; B60T 8/34
[52] U.S. Cl. ...................... 303/116.2; 303/11; 303/113.2
[58] Field of Search ............................ 303/10, 11, 116.2, 303/113.2, 139, 140, 146, 113.3, 113.4, 116.1, 900, 901

[56] References Cited

U.S. PATENT DOCUMENTS

| | | |
|---|---|---|
| 4,878,715 | 11/1989 | Toda . |
| 5,275,476 | 1/1994 | Maisch ................... 303/113.2 |
| 5,484,194 | 1/1996 | Reinartz et al. ................ 303/116.2 |
| 5,711,585 | 1/1998 | Tozu et al. ................ 303/146 |
| 5,820,229 | 10/1998 | Pueschel ................ 303/139 |
| 5,882,089 | 3/1999 | Nakamura et al. ................ 303/10 |
| 5,927,826 | 7/1999 | Sonnenschein ................ 303/116.2 |
| 5,927,828 | 7/1999 | Beck ................ 303/116.2 |

FOREIGN PATENT DOCUMENTS

| | | |
|---|---|---|
| 1-223063 | 9/1989 | Japan . |
| 5-65388 | 9/1993 | Japan . |
| 6-508577 | 9/1994 | Japan . |
| 6-510968 | 12/1994 | Japan . |

*Primary Examiner*—Robert J. Oberleitner
*Assistant Examiner*—Jeffrey Woller
*Attorney, Agent, or Firm*—Burns, Doane, Swecker & Mathis, LLP

[57] ABSTRACT

A compact brake pressure controller that can be produced at relatively low cost and which is capable of pressurizing a wheel cylinder quickly through use of a hydraulic pump includes shut-off valves provided between a master cylinder and pressure increasing valves, and suction valves alternatively permitting and preventing brake fluid flow through the suction paths. Restricted passages are also provided between the shut-off valves and the pressure increasing valves. As applied to traction control, when the speed of the driving wheels exceeds the speed of the driven wheels by an amount in the excess of a first predetermined value, the suction valves are opened and the hydraulic pumps are driven to supply brake fluid in the master cylinder to the wheel cylinders. When the speed of the driving wheels exceeds the speed of the driven wheels by an amount in excess of a second predetermined value which is greater than the first predetermined value, the shut-off valves are closed and hydraulic pumps are driven to further supply the brake fluid in the master cylinder to the wheel cylinders.

20 Claims, 3 Drawing Sheets

BRAKE PRESSURE CONTROLLER

FIELD OF THE INVENTION

The present invention generally relates to a vehicle brake system. More particularly, the present invention pertains to a brake pressure controller for controlling the brake pressure supplied to wheel cylinders of a vehicle.

BACKGROUND OF THE INVENTION

Japanese Unexamined Patent Publication No. H6-510968 discloses a brake pressure controller which includes a suction path for drawing out brake fluid in a master cylinder through use of a hydraulic pump to supply such brake fluid to the wheel cylinders. In addition, a main path connects the master cylinder and the wheel cylinders, a normally closed suction valve is provided on the suction path and a normally open shut-off valve is provided on the main path.

This controller performs traction control in which the suction valve is opened and the shut-off valve is closed regardless of the operation of a brake pedal, and the hydraulic pump is operated to supply brake fluid in the master cylinder to the wheel cylinders. To perform quick pressurization using the hydraulic pump at the beginning of the control operation, it is possible to either use a very large hydraulic pump or use a hydraulic pump for charging in addition to the hydraulic pump for pressurization. In either case, the size of the controller is significantly increased as is the cost of the overall apparatus.

In light of the foregoing, a need exists for a brake pressure controller in which the above-described problem is addressed.

More particularly, a need exists for a brake pressure controller which is able to effect quick pressurization at the beginning of traction control operation without the need for a larger hydraulic pump or a second hydraulic pump.

SUMMARY OF THE INVENTION

In light of the foregoing, the present invention provides a brake pressure controller that includes a master cylinder for generating a brake pressure through operation of the brake pedal, a wheel cylinder connected to the master cylinder by a main path to which the brake pressure generated in the master cylinder is transmitted, a pressure increasing valve provided in the main path, a relief reservoir linked to the wheel cylinder through a relief path, a pressure reducing valve provided in the relief path, and a shut-off valve provided in the main path between the master cylinder and the pressure increasing valve. A hydraulic pump is linked to the relief reservoir for returning brake fluid in the relief reservoir to a portion of the main path between the pressure increasing valve and the shut-off valve. A suction valve is disposed in a suction path that links the master cylinder to a part of the relief path between the suction side of the hydraulic pump and the relief reservoir. The suction valve is positionable in one position for permitting communication between the suction side of the hydraulic pump and the master cylinder and a second position for preventing communication between the suction side of the hydraulic pump and the master cylinder. A restricted passage is disposed between the shut-off valve and the pressure increasing valve. A control device controls the suction valve and the hydraulic pump so that when a predetermined value that is based on a state of the vehicle exceeds a first predetermined value, the suction valve is opened and the hydraulic pump is driven to draw brake fluid from the master cylinder and supply brake fluid to the wheel cylinder, and controls the shut off valve so that when the predetermined value based on the state of the vehicle exceeds a second predetermined value greater than the first predetermined value, the shut-off valve is closed and the hydraulic pump is driven to further supply the brake fluid in the master cylinder to the wheel cylinder.

Another aspect of the present invention involves a brake pressure controller for a vehicle that includes a master cylinder for generating brake pressure through operation of the brake pedal, a wheel cylinder connected to the master cylinder by a main path to which the brake pressure generated in the master cylinder is transmitted, a suction path linked to the master cylinder, a normally closed suction valve disposed in the suction path, and a hydraulic pump having a suction side linked to the suction path for drawing fluid from the master cylinder through the suction valve and a discharge side linked to the main path for discharging brake fluid to the main path. A control device opens the suction valve when a predetermined value based on a state of the vehicle exceeds a first predetermined value to permit the hydraulic pump to draw brake fluid out of the master cylinder by way of the suction valve and the suction path and when the predetermined value based on the state of the vehicle exceeds a second predetermined value that is greater than the first predetermined value. An arrangement is also provided for permitting a portion of the brake fluid discharged by the hydraulic pump to be transmitted to the wheel cylinder and a portion of the brake fluid discharged by the hydraulic pump to be transmitted to the master cylinder when the predetermined value based on the state of the vehicle exceeds the first predetermined value, and for permitting all of the brake fluid discharged by the hydraulic pump to be transmitted to the wheel cylinder when the predetermined value based on the state of the vehicle exceeds the second predetermined value.

Another aspect of the present invention involves a brake pressure controller for a vehicle that includes a master cylinder for generating brake pressure through operation of the brake pedal, a wheel cylinder connected to the master cylinder by a main path to which the brake pressure generated in the master cylinder is transmitted, a suction path linked to the master cylinder, and a hydraulic pump having a suction side linked to the suction path and a discharge side linked to the main path for discharging brake fluid to the main path. The brake pressure controller is designed to permit the hydraulic pump to draw brake fluid out of the master cylinder by way of the suction path and to permit less than all of the brake fluid discharged by the hydraulic pump to be transmitted to the wheel cylinder when a predetermined value based on a state of the vehicle exceeds a first predetermined value, and to permit the hydraulic pump to draw brake fluid out of the master cylinder by way of the suction path and to permit all of the brake fluid discharged by the hydraulic pump to be transmitted to the wheel cylinder when the predetermined value based on the state of the vehicle exceeds a second predetermined value that is greater than the first predetermined value.

BRIEF DESCRIPTION OF THE DRAWING FIGURES

The foregoing and additional details associated with the present invention will become more apparent from the following detailed description considered with reference to the accompanying drawing figures in which like elements are designated by like reference numerals and wherein.

DETAILED DESCRIPTION OF PREFERRED EMBODIMENTS

Figure 1:
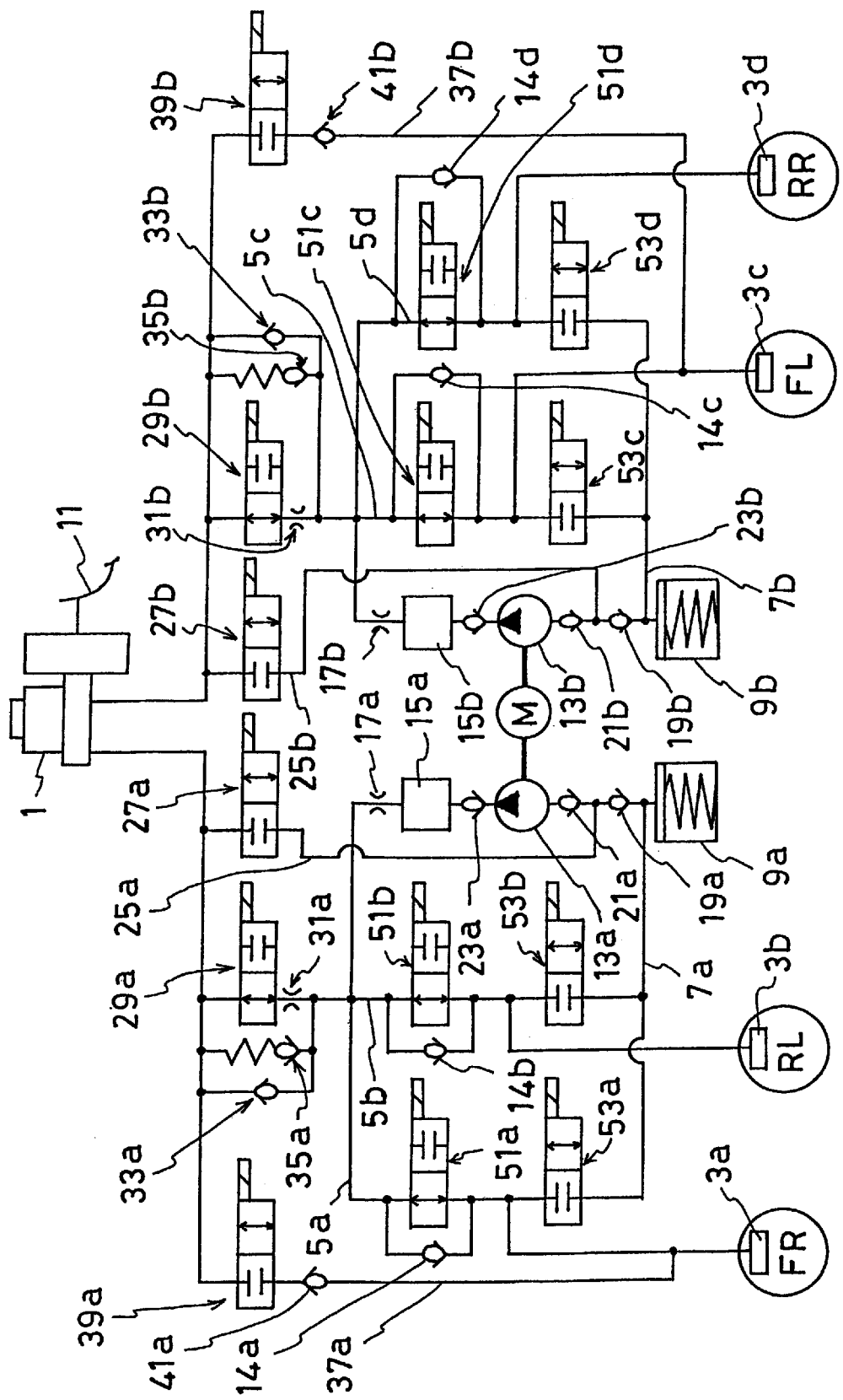
FIG. 1 is a schematic illustration of a vehicle brake pressure controller according to a first embodiment of the present invention.

FIG. 1 schematically illustrates the system forming the brake pressure controller according to the present invention which is used mainly for front-wheel-drive vehicles and is referred to as a diagonal piping system. Pressure increasing valves 51a, 51b, 51c, 51d, which are normally open electromagnetic valves are respectively disposed in main paths 5a, 5b, 5c, 5d. The main paths 5a, 5b, 5c, 5d are connected to a master cylinder 1 and four wheel cylinders 3a, 3b, 3c, 3d provided on respective ones of the vehicle wheels. One of the wheel cylinders 3a is provided on the front right wheel FR, another one of the wheel cylinders 3b is provided on the rear left wheel RL, a third wheel cylinder 3c is provided on the front left wheel FL, and the last wheel cylinder 3d is provided on the rear right wheel RR. The master cylinder 1 is a fluid pressure generator that is operated by a brake pedal 11.

A relief reservoir 9a is connected through a relief path 7a to the main paths 5a, 5b that link the master cylinder 1 and the wheel cylinders 3a, 3b mounted on the front right wheel FR and the rear left wheel RL, respectively. A relief reservoir 9b is also connected through another relief path 7b to the main paths 5c, 5d linking the master cylinder 1 and the wheel cylinders 3c, 3d mounted on the front left wheel FL and the rear right wheel RR, respectively.

Pressure reducing valves 53a, 53b, which are normally closed electromagnetic valves, are disposed on the relief path 7a. The pressure reducing valve 53a is located between the relief reservoir 9a and the wheel cylinder 3a, and the pressure reducing valve 53b is located between the relief reservoir 9a and the wheel cylinder 3b. Pressure reducing valves 53c, 53d, which are normally closed electromagnetic valves, are disposed on the relief path 7b. The pressure reducing valve 53c is located between the relief reservoir 9b and the wheel cylinder 3c, and the pressure reducing valve 53d is located between the relief reservoir 9b and the wheel cylinder 3d.

A one-way valve 14a is provided in the main path 5a in parallel with the pressure increasing valve 51a to allow brake fluid to flow only from the wheel cylinder 3a to the master cylinder 1. Another one-way valve 14b is provided in the main path 5b in parallel with the pressure increasing valve 51b to allow brake fluid to flow only from the wheel cylinder 3b to the master cylinder 1. A third one-way valve 14c is provided in the main path 5c in parallel with pressure increasing valve 51c to allow the brake fluid to flow only from the wheel cylinder 3c to the master cylinder 1. A fourth one-way valve 14d is provided in the main path 5d in parallel with pressure increasing valve 51d to allow the brake fluid to flow only from the wheel cylinder 3d to the master cylinder 1.

Two hydraulic pumps 13a, 13b each driven by a common electric motor M are provided on the respective relief paths 7a, 7b. A damper 15a and an orifice 17a are disposed downstream of one of the pumps 13a while another damper 15b and another orifice 17b are disposed downstream of the other pump 13b.

A first pair of check valves 19a, 21a is provided between the relief reservoir 9a and the hydraulic pump 13a, and a second pair of check valves 19b, 21b is provided between the relief reservoir 9b and the hydraulic pump 13b. A check valve 23a is disposed between the hydraulic pump 13a and the damper 15a and another check valve 23b is disposed between the hydraulic pump 13b and the damper 15b.

A suction path 25a links the relief path 7a at a point upstream of the pump 13a to the master cylinder 1, and a normally closed suction valve 27a is disposed in the suction path 25a. Similarly, a suction path 25b links the relief paths 7b at a point upstream of the pump 13b to the master cylinder 1, and a normally closed suction valve 27b is provided in the suction path 25b.

A normally open shut-off valve 29a is provided between the pressure increasing valves 51a, 51b and the master cylinder 1, and another normally open shut-off valve 29b is provided between the pressure increasing valves 51c, 51d and the master cylinder 1. Further, a restricted passage 31a formed by an orifice is provided between the shut-off valve 29a and the pressure increasing valves 51a, 51b, while a restricted passage 31b formed by an orifice is provided between the shut-off valve 29b and the pressure increasing valves 51c, 51d.

Disposed in parallel with the shut-off valve 29a is a one-way valve 33a which allows the brake fluid to flow only from the master cylinder 1 to the wheel cylinders 3a, 3b and a one-way valve 35a which allows the brake fluid to flow only from the pressure increasing valves 51a, 51b to the master cylinder 1. In a similar manner, a one-way valve 33b is disposed in parallel with the shut-off valve 29b for allowing the brake fluid to flow only from the master cylinder 1 to the wheel cylinders 3c, 3d and a one-way valve 35b is disposed in parallel with the shut-off valve 29b for allowing the brake fluid to flow only from the pressure increasing valves 51c, 51d to the master cylinder 1. The one-way valves 35a, 35b each possess a valve-opening pressure equal to or higher than the brake fluid discharging pressure of the respective hydraulic pumps 13a, 13b.

A bypass path 37a links the master cylinder 1 to the wheel cylinder 3a for the front right wheel FR and a bypass path 37b links the master cylinder to the wheel cylinder 3c for the front left wheel FL. Normally closed cut valves 39a, 39b are provided on the bypass paths 37a, 37b, respectively. A check valve 41a is provided between the cut valve 39a and the wheel cylinder 3a, and another check valve 41b is provided between the cut valve 39b and the wheel cylinder 3c. These check valves 41a, 41b allow the brake fluid to flow only from the master cylinder 1 to the respective wheel cylinders 3a, 3c.

The bypass paths 37a and 37b are provided to produce a sufficient braking force at the driving wheels FR and FL when the driver operates the brake pedal 11 while traction control is active.

Figure 3:
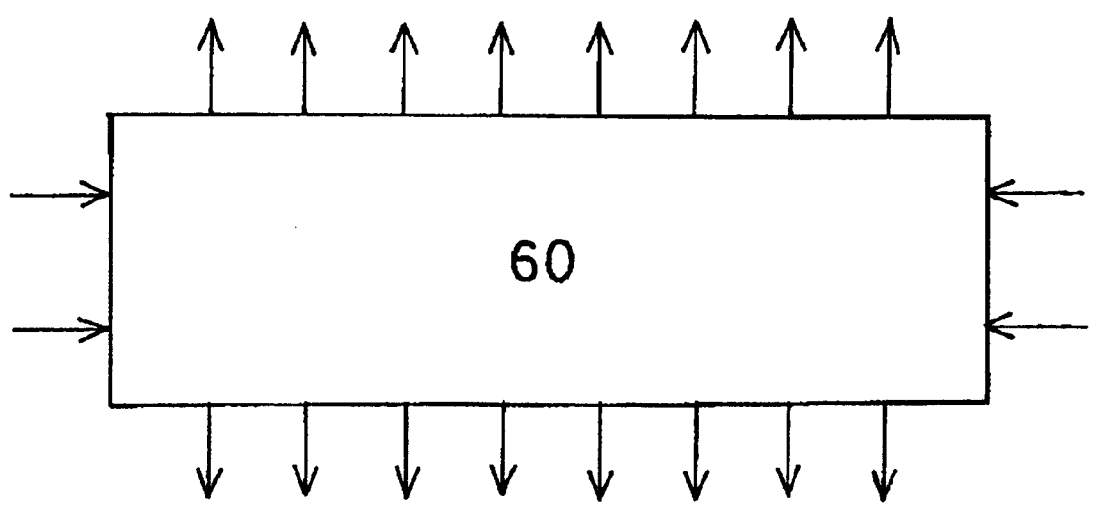
FIG. 3 is a schematic illustration of a control device for controlling operation of the brake pressure controllers shown in FIGS. 1 and 2.

The brake pressure controller also includes a control device 60 which is generally illustrated in FIG. 3. The control device 60 receives inputs from various sources such as wheel speed sensors operatively associated with the wheels FR, RL, FL, RR, and outputs signals to various parts of the controller such as the motor and the valves for controlling operation of the controller.

The operation of the above-described brake pressure controller under traction control is as follows. When traction control is active, wheel speed sensors provided on the wheels FR, RL, FL, RR detect, for example, a slip of the driving wheel FR based on the fact that the wheel speed of the driving wheel FR becomes equal to or greater than a predetermined value $\Delta V_1$ relative to the wheel speeds of the driven wheels RL, RR. Then, by virtue of the control device 60, the suction valve 27a is opened, the pressure increasing valve 51b is closed, and the hydraulic pump 13a is driven by the electric motor M. As a result, the brake fluid in the master cylinder 1 is absorbed, or drawn through the suction valve 27a, through the suction path 25a and through the check valve 21a, and is the discharged to the main path 5a by the pump 13a.

A part of the brake fluid that is discharged by the pump 13a is returned to the master cylinder 1 through the restricted passage 31a and the shut-off valve 29a, and the remaining brake fluid is supplied to the wheel cylinder 3a for the front right wheel FR through the pressure increasing valve 51a. As a result, a predetermined amount of brake fluid is supplied to the wheel cylinder 3a for the front right wheel FR in advance.

When the wheel speed of the driving wheel FR relative to the driven wheels RL and RR becomes equal to or greater than a value $\Delta V_2$ which is greater than the predetermined value $\Delta V_1$, the shut-off valve 29a is closed and the hydraulic pump 13a is driven by the electric motor M to absorb or draw in brake fluid in the master cylinder 1 through the suction valve 27a, through the suction path 25a and through the check valve 21a. The pump 13a then discharges the brake fluid to the wheel cylinder 3a for the front right wheel FR through the pressure increasing valve 51a. This exerts a braking force on the front right wheel FR to reduce the slip of the wheel and effect traction control.

The same operation is also performed to effect traction control for the front left wheel FL. In this situation, the when traction control is active, the wheel speed sensors detect a slip of the driving wheel FL based on the fact that the wheel speed of the front left driving wheel FL becomes equal to or greater than a predetermined value $\Delta V_1$ relative to the wheel speeds of the driven wheels RL, RR. Then, the control device 60 causes the suction valve 27b to be opened, the pressure increasing valve 51d to be closed, and the hydraulic pump 13b to be driven by the electric motor M. As a result, brake fluid in the master cylinder 1 is absorbed, or drawn through the suction valve 27b, through the suction path 25b and through the check valve 21b. The brake fluid is then discharged by the pump 13b to the main path 5c by the pump 13b.

A part of the brake fluid that is discharged by the pump 13b is returned to the master cylinder 1 through the restricted passage 31b and the shut-off valve 29b, and the remaining brake fluid is supplied to the wheel cylinder 3c for the front left wheel FL through the pressure increasing valve 51c. As a result, a predetermined amount of brake fluid is supplied to the wheel cylinder 3c for the front left wheel FR in advance.

When the wheel speed of the driving wheel FL relative to the driven wheels RL and RR becomes equal to or greater than a value $\Delta V_2$ which is greater than the predetermined value $\Delta V_1$, the shut-off valve 29b is closed and the hydraulic pump 13b is driven by the electric motor M to absorb or draw in brake fluid in the master cylinder 1 through the suction valve 27b, through the suction path 25b and through the check valve 21b. The pump 13b then discharges the brake fluid to the wheel cylinder 3c for the front left wheel FL through the pressure increasing valve 51c. This exerts a braking force on the front left wheel FR to reduce the slip of the wheel and effect traction control.

It is thus seen that when the wheel speed of the driving wheel(s) equals or exceeds a first predetermined value relative to the wheel speeds of the driven wheels, a part of the brake fluid that is drawn out of the master cylinder by the pump is discharged to the wheel cylinder(s) while another part is discharged back to the master cylinder. That is, less than all of the brake fluid that is drawn out of the master cylinder by the pump is discharged to the wheel cylinder(s). Thus, a predetermined amount of brake fluid is supplied to the wheel cylinder(s) before performing control over pressurization of the wheel(s). Once the wheel speed of the driving wheel(s) relative to the wheel speeds of the driven wheels equals or exceeds a second predetermined value that is greater than the first predetermined value, a greater amount of the brake fluid that is drawn out of the master cylinder by the pump (e.g., all of the brake fluid) is discharged to the wheel cylinder(s).

Obviously, the predetermined value used for initiating the control according to the present invention is not limited to the difference between the wheel speeds of the driving and driven wheels and may be changed in various ways. That is, the predetermined value can be based on a state of the vehicle other than differences in wheel speeds.

It is to be understood that the above-described brake pressure controller system also operates under anti-skid control, although a description of such operation is not included here as it is known to persons in the art.

Figure 2:
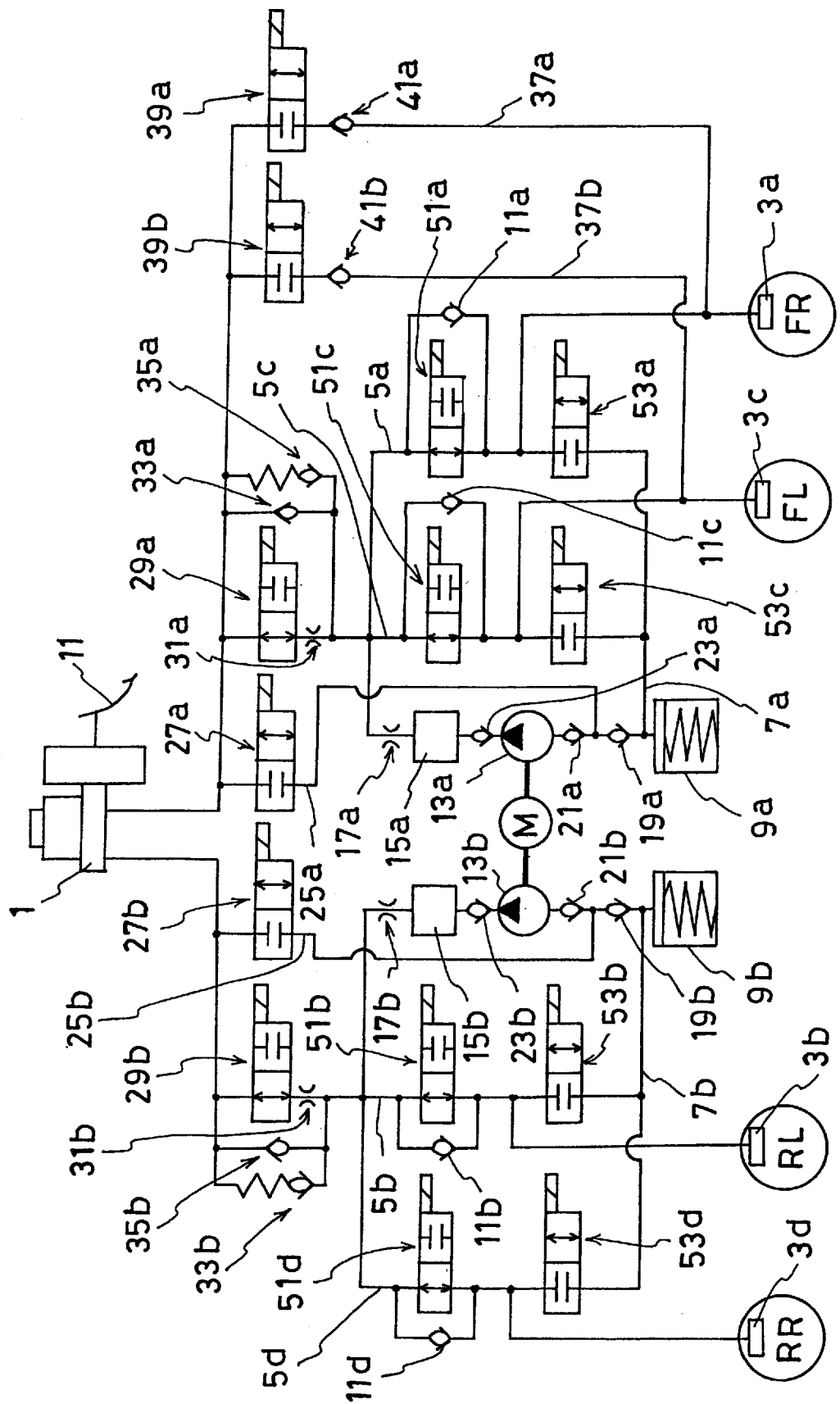
FIG. 2 is a schematic illustration of a vehicle brake pressure controller according to a second embodiment of the present invention.

FIG. 2 shows a different embodiment of the brake pressure controller according to the present invention involving the use of piping referred to as "front and rear wheel piping" used in rear-wheel-drive vehicles. Features having similar functions as those in the FIG. 1 embodiment are indicated by like reference numerals.

As seen with reference to FIG. 2, pressure increasing valves 51a, 51b, 51c, 51d, which are normally open electromagnetic valves are respectively disposed in main paths 5a, 5b, 5c, 5d. The main paths 5a, 5b, 5c, 5d are connected to a master cylinder 1 and four wheel cylinders 3a, 3b, 3c, 3d provided on respective ones of the vehicle wheels. One of the wheel cylinders 3a is provided on the front right wheel FR, another one of the wheel cylinders 3b is provided on the rear left wheel RL, a third wheel cylinder 3c is provided on the front left wheel FL, and the last wheel cylinder 3d is provided on the rear right wheel RR. The master cylinder 1 is a fluid pressure generator that is operated by a brake pedal 11.

A relief reservoir 9a is connected through a relief path 7a to the main paths 5a, 5c that link the master cylinder 1 and the wheel cylinders 3a, 3c mounted on the front right wheel FR and the front left wheel FL, respectively. A relief reservoir 9b is also connected through another relief path 7b to the main paths 5b, 5d linking the master cylinder 1 and the wheel cylinders 3b, 3d mounted on the rear left wheel RL and the rear right wheel RR, respectively.

Pressure reducing valves 53a, 53c, which are normally closed electromagnetic valves, are disposed on the relief path 7a. The pressure reducing valve 53a is located between the relief reservoir 9a and the wheel cylinder 3a, and the pressure reducing valve 53c is located between the relief reservoir 9a and the wheel cylinder 3c. Pressure reducing valves 53b, 53d, which are normally closed electromagnetic valves, are disposed on the relief path 7b. The pressure reducing valve 53b is located between the relief reservoir 9b and the wheel cylinder 3b, and the pressure reducing valve 53d is located between the relief reservoir 9b and the wheel cylinder 3d.

A one-way valve 11a is provided in the main path 5a in parallel with the pressure increasing valve 51a to allow brake fluid to flow only from the wheel cylinder 3a to the master cylinder 1. Another one-way valve 11c is provided in the main path 5c in parallel with the pressure increasing valve 51c to allow brake fluid to flow only from the wheel cylinder 3c to the master cylinder 1. A third one-way valve 11b is provided in the main path 5b in parallel with pressure increasing valve 51b to allow the brake fluid to flow only from the wheel cylinder 3b to the master cylinder 1. A fourth one-way valve 11d is provided in the main path 5d in parallel with pressure increasing valve 51d to allow the brake fluid to flow only from the wheel cylinder 3d to the master cylinder 1.

Two hydraulic pumps 13a, 13b each driven by a common electric motor M are provided on the respective relief paths 7a, 7b. A damper 15a and an orifice 17a are disposed downstream of one of the pumps 13a while another damper 15b and another orifice 17b are disposed downstream of the other pump 13b.

A first pair of check valves 19a, 21a is provided between the relief reservoir 9a and the hydraulic pump 13a, and a second pair of check valves 19b, 21b is provided between the relief reservoir 9b and the hydraulic pump 13b. A check valve 23a is disposed between the hydraulic pump 13a and the damper 15a and another check valve 23b is disposed between the hydraulic pump 13b and the damper 15b.

A suction path 25a links the relief path 7a at a point upstream of the pump 13a to the master cylinder 1, and a normally closed suction valve 27a is disposed in the suction path 25a. Similarly, a suction path 25b links the relief paths 7b at a point upstream of the pump 13b to the master cylinder 1, and a normally closed suction valve 27b is provided in the suction path 25b.

A normally open shut-off valve 29a is provided between the pressure increasing valves 51a, 51c and the master cylinder 1, and another normally open shut-off valve 29b is provided between the pressure increasing valves 51b, 51d and the master cylinder 1. Further, a restricted passage 31a formed by an orifice is provided between the shut-off valve 29a and the pressure increasing valves 51a, 51c, while a restricted passage 31b formed by an orifice is provided between the shut-off valve 29b and the pressure increasing valves 51b, 51d.

Disposed in parallel with the shut-off valve 29a is a one-way valve 33a which allows the brake fluid to flow only from the master cylinder 1 to the wheel cylinders 3a, 3c and a one-way valve 35a which allows the brake fluid to flow only from the pressure increasing valves 51a, 51c to the master cylinder 1. In a similar manner, a one-way valve 33b is disposed in parallel with the shut-off valve 29b for allowing the brake fluid to flow only from the master cylinder 1 to the wheel cylinders 3b, 3d and a one-way valve 35b is disposed in parallel with the shut-off valve 29b for allowing the brake fluid to flow only from the pressure increasing valves 51b, 51d to the master cylinder 1. The one-way valves 35a, 35b each possess a valve-opening pressure equal to or higher than the brake fluid discharging pressure of the respective hydraulic pumps 13a, 13b.

A bypass path 37a links the master cylinder 1 to the wheel cylinder 3a for the front right wheel FR and a bypass path 37b links the master cylinder to the wheel cylinder 3c for the front left wheel FL. Normally closed cut valves 39a, 39b are provided on the bypass paths 37a, 37b, respectively. A check valve 41a is provided between the cut valve 39a and the wheel cylinder 3a, and another check valve 41b is provided between the cut valve 39b and the wheel cylinder 3c. These check valves 41a, 41b allow the brake fluid to flow only from the master cylinder 1 to the respective wheel cylinders 3a, 3c.

The bypass paths 37a and 37b are provided to produce a sufficient braking force at the wheels FR and FL when the driver operates the brake pedal 11 while traction control is active.

The brake pressure controller shown in FIG. 2 also includes the control device 60 generally illustrated in FIG. 3. As noted above, the control device 60 receives inputs from various sources such as wheel speed sensors operatively associated with the wheels FR, RL, FL, RR, and outputs signals to various parts of the controller such as the motor and the valves for controlling operation of the controller.

The operation of the above-described brake pressure controller under traction control is similar to that described above. When traction control is active, wheel speed sensors provided on the wheels FR, RL, FL, RR detect, for example, a slip of the driving wheel RR based on the fact that the wheel speed of the rear right driving wheel RR is equal to or greater than a predetermined value $\Delta V_1$ relative to the wheel speeds of the driven wheels FL, FR. Through operation of the control device 60, the suction valve 27b is opened, the pressure increasing valve 51b is closed, and the hydraulic pump 13b is driven by the electric motor M. As a result, the brake fluid in the master cylinder 1 is absorbed or drawn through the suction valve 27b, through the suction path 25b and through the check valve 21b, and is the discharged to the main path 5d by the pump 13b.

A part of the brake fluid that is discharged by the pump 13b is returned to the master cylinder 1 through the restricted passage 31b and the shut-off valve 29b, and the remaining brake fluid is supplied to the wheel cylinder 3d for the rear right wheel RR through the pressure increasing valve 51d. As a result, a predetermined amount of brake fluid is supplied in advance to the wheel cylinder 3d for the rear right wheel RR.

When the wheel speed of the driving wheel RR relative to the driven wheels FL and FR becomes equal to or greater than a value $\Delta V_2$ which is greater than the predetermined value $\Delta V_1$, the shut-off valve 29b is closed and the hydraulic pump 13b is driven by the electric motor M to draw in brake fluid in the master cylinder 1 through the suction valve 27b, through the suction path 25b and through the check valve 21b. The pump 13b then discharges the brake fluid to the wheel cylinder 3d for the rear right wheel RR through the pressure increasing valve 51d. This exerts a braking force on the rear right wheel RR to reduce the slip of the wheel and effect traction control.

The same operation is also performed to effect traction control for the rear left wheel RL. When traction control is active, the wheel speed sensors detect a slip of the driving wheel RL based on the fact that the wheel speed of the rear left driving wheel RL becomes equal to or greater than a predetermined value $\Delta V_1$ relative to the wheel speeds of the driven wheels FL, FR. Then, the control device 60 causes the suction valve 27b to be opened, the pressure increasing valve 51d to be closed, and the hydraulic pump 13b to be driven by the electric motor M. As a result, brake fluid in the master cylinder 1 is drawn through the suction valve 27b, through the suction path 25b and through the check valve 21b. The brake fluid is then discharged by the pump 13b to the main path 5b by the pump 13b.

A part of the brake fluid that is discharged by the pump 13b is returned to the master cylinder 1 through the restricted passage 31b and the shut-off valve 29b, and the remaining brake fluid is supplied to the wheel cylinder 3b for the rear left wheel RL through the pressure increasing valve 51b. As a result, a predetermined amount of brake fluid is supplied in advance to the wheel cylinder 3b for the rear left wheel RL.

When the wheel speed of the driving wheel RL relative to the driven wheels FL and FR becomes equal to or greater than a value $\Delta V_2$ which is greater than the predetermined value $\Delta V_1$, the shut-off valve 29b is closed and the hydraulic pump 13b is driven by the electric motor M to draw in brake fluid in the master cylinder 1 through the suction valve 27b, through the suction path 25b and through the check valve 21b. The pump 13b then discharges the brake fluid to the wheel cylinder 3b for the rear left wheel RL through the pressure increasing valve 51b. This exerts a braking force on the rear left wheel RL to reduce the slip of the wheel and effect traction control.

Thus, when the wheel speed of the driving wheel(s) equals or exceeds a first predetermined value relative to the wheel speeds of the driven wheels, a part of the brake fluid that is drawn out of the master cylinder by the pump is discharged to the wheel cylinder(s) while another part is discharged back to the master cylinder. That is, less than all of the brake fluid that is drawn out of the master cylinder by the pump is discharged to the wheel cylinder(s). Consequently, a predetermined amount of brake fluid is supplied to the wheel cylinder(s) before performing control over pressurization of the wheel(s). Once the wheel speed of the driving wheel(s) relative to the wheel speeds of the driven wheels equals or exceeds a second predetermined value that is greater than the first predetermined value, a greater amount of the brake fluid that is drawn out of the master cylinder by the pump (e.g., all of the brake fluid) is discharged to the wheel cylinder(s).

As mentioned above, the predetermined value(s) used for initiating the control according to the present invention is not limited to the difference between the wheel speeds of the driving and driven wheels and may be changed in various ways. Also, the above-described brake pressure controller shown in FIG. 2 also operates under anti-skid control, although a description of such operation is not included here as it is known in the art.

Further, the present invention is not limited to use with traction control and may be applied to systems for controlling the stability of vehicles during travel.

As described above, the present invention allows control of pressurization with a simple configuration because it allows a predetermined amount of brake fluid to be supplied to wheel cylinders before performing control over pressurization of wheels. Thus, the controller can be made compact at a relatively low cost.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A brake pressure controller for a vehicle having a brake pedal comprising:
   a master cylinder for generating a brake pressure through operation of the brake pedal;
   a wheel cylinder connected to said master cylinder by a main path to which the brake pressure generated in said master cylinder is transmitted;
   a pressure increasing valve provided in said main path;
   a relief reservoir linked to said wheel cylinder through a relief path;
   a pressure reducing valve provided on said relief path;
   a shut-off valve provided in said main path between said master cylinder and said pressure increasing valve;
   a hydraulic pump linked to said relief reservoir for returning brake fluid in said relief reservoir to a section in said main path between said pressure increasing valve and said shut-off valve, said hydraulic pump having a suction side and a discharge side;
   a suction valve provided in a suction path that links said master cylinder to a part of said relief path between the suction side of said hydraulic pump and said relief reservoir, said suction valve being positionable in one position for permitting communication between the suction side of the hydraulic pump and the master cylinder and being positionable in a second position for preventing communication between the suction side of the hydraulic pump and the master cylinder;
   a restricted passage provided between said shut-off valve and said pressure increasing valve;
   a control device for controlling the suction valve and the hydraulic pump so that when a determined value that is based on a state of the vehicle exceeds a first predetermined value, said suction valve is opened and said hydraulic pump is driven to draw brake fluid from said master cylinder and supply brake fluid to the wheel cylinder, and for controlling the shut off valve so that when said determined value based on the state of the vehicle exceeds a second predetermined value greater than said first predetermined value, said shut-off valve is closed and said hydraulic pump is driven to further supply the brake fluid in said master cylinder to said wheel cylinder;
   a bypass passage linking the master cylinder to the wheel cylinder; and
   a normally closed cut valve disposed in the bypass path.

2. The brake pressure controller for a vehicle according to claim 1, wherein said suction valve is a normally closed valve and said shut-off valve is a normally open valve.

3. The brake pressure controller for a vehicle according to claim 1, including a first one-way valve disposed in parallel with the shut-off valve for allowing brake fluid to flow only from said master cylinder to said wheel cylinder, and a second one-way valve disposed in parallel with the shut-off valve for allowing brake fluid to flow only from said pressure increasing valve to said master cylinder.

4. A brake pressure controller for a vehicle having a brake pedal, a driven wheel and a drive wheel, comprising:
   a master cylinder for generating brake pressure through operation of the brake pedal;
   a wheel cylinder connected to said master cylinder by a main path to which the brake pressure generated in said master cylinder is transmitted, the wheel cylinder being operatively associated with one of the driven wheel and the drive wheel;
   a suction path linked to said master cylinder;
   a normally closed suction valve disposed in the suction path;
   a hydraulic pump having a suction side linked to said suction path for drawing fluid from said master cylinder through said suction valve and a discharge side linked to said main path for discharging brake fluid to said main path;

a control device for opening said suction valve when a determined value based on a state of the vehicle exceeds a first predetermined value to permit said hydraulic pump to draw brake fluid out of said master cylinder by way of said suction valve and said suction path and when said determined value based on the state of the vehicle exceeds a second predetermined value that is greater than said first predetermined value;

means controlled by said control device for permitting a portion of the brake fluid discharged by the hydraulic pump to be transmitted to the wheel cylinder and a portion of the brake fluid discharged by the hydraulic pump to be transmitted to the master cylinder when said determined value based on the state of the vehicle exceeds said first predetermined value, and for permitting all of said brake fluid discharged by the hydraulic pump to be transmitted to the wheel cylinder when said determined value based on the state of the vehicle exceeds said second predetermined value, said wheel cylinder being operatively associated with the driving wheel and said determined value based on the state of the vehicle including a difference between a wheel speed of the driving wheel and a wheel speed of the driven wheel.

5. The brake pressure controller for a vehicle according to claim 4, wherein said means includes a normally open shut-off valve disposed in said main path and a restricted passage positioned between said hydraulic pump and said shut-off valve.

6. The brake pressure controller for a vehicle according to claim 5, including a first one-way valve disposed in parallel with the shut-off valve for allowing brake fluid to flow only from said master cylinder to said wheel cylinder, and a second one-way valve disposed in parallel with the shut-off valve for allowing brake fluid to flow only from said wheel cylinder to said master cylinder.

7. The brake pressure controller for a vehicle according to claim 4, including a pressure increasing valve provided in said main path, a relief reservoir linked to said wheel cylinder through a relief path, and a pressure reducing valve provided in said relief path.

8. The brake pressure controller for a vehicle according to claim 4, including a bypass path linking the master cylinder to the wheel cylinder.

9. A brake pressure controller for a vehicle having a brake pedal, a driven wheel and a drive wheel, comprising:

a master cylinder for generating brake pressure through operation of the brake pedal;

a wheel cylinder connected to said master cylinder by a main path to which the brake pressure generated in said master cylinder is transmitted, the wheel cylinder being operatively associated with one of the driven wheel and the drive wheel;

a suction path linked to said master cylinder;

a normally closed suction valve disposed in the suction path;

a hydraulic pump having a suction side linked to said suction path for drawing fluid from said master cylinder through said suction valve and a discharge side linked to said main path for discharging brake fluid to said main path;

a control device for opening said suction valve when a determined value based on a state of the vehicle exceeds a first predetermined value to permit said hydraulic pump to draw brake fluid out of said master cylinder by way of said suction valve and said suction path and when said determined value based on the state of the vehicle exceeds a second predetermined value that is greater than said first predetermined value;

means controlled by said control device for permitting a portion of the brake fluid discharged by the hydraulic pump to be transmitted to the wheel cylinder and a portion of the brake fluid discharged by the hydraulic pump to be transmitted to the master cylinder when said determined value based on the state of the vehicle exceeds said first predetermined value, and for permitting all of said brake fluid discharged by the hydraulic pump to be transmitted to the wheel cylinder when said determined value based on the state of the vehicle exceeds said second predetermined value, a bypass path linking the master cylinder to the wheel cylinder; and a normally closed cut valve disposed in the bypass path.

10. The brake pressure controller for a vehicle according to claim 9, wherein said means includes a normally open shut-off valve disposed in said main path and a restricted passage positioned between said hydraulic pump and said shut-off valve.

11. The brake pressure controller for a vehicle according to claim 10, including a first one-way valve disposed in parallel with the shut-off valve for allowing brake fluid to flow only from said master cylinder to said wheel cylinder, and a second one-way valve disposed in parallel with the shut-off valve for allowing brake fluid to flow only from said wheel cylinder to said master cylinder.

12. A brake pressure controller for a vehicle having a brake pedal, a driven wheel and a drive wheel, comprising:

a master cylinder for generating brake pressure through operation of the brake pedal;

a wheel cylinder connected to said master cylinder by a main path to which the brake pressure generated in said master cylinder is transmitted, the wheel cylinder being operatively associated with one of the driven wheel and the drive wheel;

a suction path linked to said master cylinder;

a hydraulic pump having a suction side linked to said suction path and a discharge side linked to said main path for discharging brake fluid to said main path;

means for permitting said hydraulic pump to draw brake fluid out of said master cylinder by way of said suction path and for permitting less than all of the brake fluid discharged by the hydraulic pump to be transmitted to the wheel cylinder when a determined value based on a state of the vehicle exceeds a first predetermined value, and for permitting said hydraulic pump to draw brake fluid out of said master cylinder by way of said suction path and for permitting all of said brake fluid discharged by said hydraulic pump to be transmitted to the wheel cylinder when said determined value based on the state of the vehicle exceeds a second predetermined value that is greater than said first predetermined value; and a pressure increasing valve provided in said main path, a relief reservoir linked to said wheel cylinder through a relief path, and a pressure reducing valve provided in said relief path.

13. The brake pressure controller for a vehicle according to claim 12, wherein said means includes a normally closed suction valve positioned in said suction path.

14. The brake pressure controller for a vehicle according to claim 13, wherein said means further includes a normally open shut-off valve disposed in said main path and a restricted passage positioned between said hydraulic pump and said shut-off valve.

15. The brake pressure controller for a vehicle according to claim 12, wherein said means includes a normally open shut-off valve disposed in said main path and a restricted passage positioned between said hydraulic pump and said shut-off valve.

16. The brake pressure controller for a vehicle according to claim 15, including a first one-way valve disposed in parallel with the shut-off valve for allowing brake fluid to flow only from said master cylinder to said wheel cylinder, and a second one-way valve disposed in parallel with the shut-off valve for allowing brake fluid to flow only from said wheel cylinder to said master cylinder.

17. The brake pressure controller for a vehicle according to claim 12, including a pressure increasing valve provided in said main path, a relief reservoir linked to said wheel cylinder through a relief path, and a pressure reducing valve provided in said relief path.

18. A brake pressure controller for a vehicle having a brake pedal, a driven wheel and a drive wheel, comprising:
 a master cylinder for generating brake pressure through operation of the brake pedal;
 a wheel cylinder connected to said master cylinder by a main path to which the brake pressure generated in said master cylinder is transmitted, the wheel cylinder being operatively associated with one of the driven wheel and the drive wheel;
 a suction path linked to said master cylinder;
 a hydraulic pump having a suction side linked to said suction path and a discharge side linked to said main path for discharging brake fluid to said main path;
 means for permitting said hydraulic pump to draw brake fluid out of said master cylinder by way of said suction path and for permitting less than all of the brake fluid discharged by the hydraulic pump to be transmitted to the wheel cylinder when a determined value based on a state of the vehicle exceeds a first predetermined value, and for permitting said hydraulic pump to draw brake fluid out of said master cylinder by way of said suction path and for permitting all of said brake fluid discharged by said hydraulic pump to be transmitted to the wheel cylinder when said determined value based on the state of the vehicle exceeds a second predetermined value that is greater than said first predetermined value;
 a bypass path linking the master cylinder to the wheel cylinder; and
 a normally closed cut valve disposed in the bypass path.

19. The brake pressure controller for a vehicle according to claim 18, wherein said means includes a normally closed suction valve positioned in said suction path.

20. The brake pressure controller for a vehicle according to claim 18, wherein said means includes a normally open shut-off valve disposed in said main path and a restricted passage positioned between said hydraulic pump and said shut-off valve.

* * * * *